United States Patent
Kanno et al.

(10) Patent No.: US 6,689,336 B2
(45) Date of Patent: Feb. 10, 2004

(54) CARBON FOAM, GRAPHITE FOAM AND PRODUCTION PROCESSES OF THESE

(75) Inventors: Koichi Kanno, Tsukuba (JP); Hirotaka Tsuruya, Tsukuba (JP); Ryuji Fujiura, Tsukuba (JP); Takeshi Koshikawa, Tsukuba (JP); Fumitaka Watanabe, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 191 days.

(21) Appl. No.: 10/052,737

(22) Filed: Jan. 23, 2002

(65) Prior Publication Data

US 2002/0136680 A1 Sep. 26, 2002

(30) Foreign Application Priority Data

Jan. 23, 2001 (JP) ........................................ 2001-013987
Jan. 7, 2002 (JP) ........................................ 2002-000251

(51) Int. Cl.$^7$ .............................................. C01B 31/02
(52) U.S. Cl. .................................................. 423/445 R
(58) Field of Search ...................................... 423/445 R

(56) References Cited

U.S. PATENT DOCUMENTS 4,067,956 A * 1/1978 Franklin et al. ......... 426/445 R
4,671,907 A * 6/1987 Iwahashi et al. ........... 264/29.5
5,961,814 A * 10/1999 Kearns ......................... 208/39

* cited by examiner

Primary Examiner—Stanley S. Silverman
Assistant Examiner—Edward M. Johnson
(74) Attorney, Agent, or Firm—Wenderoth, Lind & Ponack, LLP

(57) ABSTRACT

A carbon foam obtained by heat-treating a mesophase pitch whose softening point is 300° C. or less according to an elevated flow tester, whose ratio (Daromatic/Daliphatic) of the absorption intensity of an aromatic C—H stretching vibration, measured with FT-IR, to the absorption intensity of an aliphatic C—H stretching vibration, measured with FT-IR, is 4.0 or less and whose optically anisotropic content is at least 80%, a graphite foam obtained by heat-treating the carbon foam recited above at a temperature of 2,000° C. or higher and production processes of these.

20 Claims, 2 Drawing Sheets

CARBON FOAM, GRAPHITE FOAM AND PRODUCTION PROCESSES OF THESE

FIELD OF THE INVENTION

The present invention relates to a carbonaceous or graphitic carbon material which is obtained from a mesophase pitch as a raw material and which is excellent in heat resistance and chemical stability and has a uniform open cell structure and production processes of theses.

PRIOR ARTS OF THE INVENTION

Various foam materials, such as a plastic foam, obtained from a resin as a raw material are widely applied to heat insulating materials, cushioning materials or the like. In recent years, it is thought to apply foam materials to fields requiring various properties not heretofore required such as heat resistance, thermal conductivity, chemical stability, electrical conductivity, strength, gas diffusivity, etc. For example, the above fields include a gas diffusion electrode of a fuel cell, a bipolar plate and the like. However, a conventional foam made of a thermoplastic resin can not be used. Accordingly, the use of a thermosetting resin foam, a carbon foam obtained by carbonizing a thermosetting resin foam or a foam made of a ceramic is discussed. Since, however, thermosetting resin-based foams form a hard-to-graphitize carbon, the thermosetting resin-based foams are poor in oxidation resistance at high temperatures or corrosion resistance in a chemical reaction and are insufficient in thermal conductivity. Further, foams made of a ceramic are excellent in oxidation resistance but are very poor in thermal conductivity and electrical conductivity.

As a means for providing materials having possibility to satisfy these requirements, one of the present inventors has newly found that a novel foam material having excellent properties such as high chemical stability, heat resistance, oxidation resistance, etc., can be produced by controlling the density of a mesophase pitch by means of a heat-treatment of the mesophase pitch under the pressurization of an inert gas, and has announced this finding (Preparation, structure and application of mesophase pitches prepared from aromatic hydrocarbons using HF/BF3 as catalysts" TANSO 1992 [155] 370–378, I. Mochida, Y. Korai, K. Shimizu, S-H. Yoon, R. Fujiura.).

The above paper describes that, since the density and pore size of a mesophase pitch can be controlled according to a pressure or a temperature-increasing rate in a foaming step, no curing and no foaming agent are required and that a graphite foam can be produced by heat-treating this carbonaceous foam.

Further, U.S. Pat. No. 6,033,506 also discloses a process of producing carbon foam wherein a pitch is heat-treated under the application of a pressure of up to 1,000 psi (approximately 6.8 MPa) with an inert gas to produce a carbon foam.

As described above, it has been found that a foam material can be produced by heat-treating a pitch such as a mesophase pitch under the pressurization of an inert gas. However, since the nature of a raw material pitch required for industrially stably producing a foam of which the shape and size of a cell are uniformly controlled and which has excellent properties such as chemical stability, heat resistance and oxidation resistance, is unknown, a pitch designed as a raw material for a foam has been not yet provided. Therefore, it is difficult to control the physical properties of a foam. Further, nonuniform parts exist in large quantities in a generated foam during the production of a foam so that the problem is that the yield of a product decreases as a result.

That is, it is difficult to industrially stably produce a foam which has a uniform cell structure and various properties not hitherto attained, such as heat resistance, thermal conductivity, chemical stability, electrical conductivity, strength and diffusivity, from a generally-used conventional pitch with the physical properties of the foam having the above properties being controlled.

For carrying out a heat-treatment at a high temperature of 500° C. or higher and under a high-pressure condition of, for example, at least 6 MPa, a special reactor which can endure a high temperature and a high pressure is required. Therefore, it is difficult to produce a foam industrially economically. Accordingly, it is required to control the nature of a carbon foam such as a bulk density under a low-pressure condition.

SUMMARY OF THE INVENTION

It is an object of the present invention to provide a pitch from which a foam having a uniform cell structure and various properties not hitherto attained, such as heat resistance, thermal conductivity, chemical stability, electrical conductivity, strength, diffusivity, etc., can be industrially stably produced with the physical properties of the foam being controlled and provide a carbon foam and a graphite foam satisfying the above properties from the pitch.

It is another object of the present invention to provide a carbon foam and a graphite foam which are obtained by controlling the nature of a carbon foam having a uniform cell structure and properties such as heat resistance, thermal conductivity, chemical stability, electrical conductivity, strength, gas diffusivity, etc., under a low-pressure production condition and the production processes of these.

According to the present invention 1, there is provided a carbon foam which is obtained by heat-treating a mesophase pitch whose softening point is 300° C. or less according to an elevated flow tester, whose ratio (Daromatic/Daliphatic) of the absorption intensity of an aromatic C—H stretching vibration, measured with FT-IR, to the absorption intensity of an aliphatic C—H stretching vibration, measured with FT-IR, is 4.0 or less and whose optically anisotropic content is at least 80%.

According to the present invention 1, further, there is provided a carbon foam as recited above, wherein the mesophase pitch has an aromatic carbon index fa value of from 0.80 to 0.97, the aromatic carbon index fa value being represented by the formula (1), $$fa=1-(H/C)/x(1+(D_{aromatic}/D_{aliphatic}) \times (\epsilon_{aliphatic}/\epsilon_{aromatic})) \quad (1)$$

in which (H/C) is an atom ratio of hydrogen to carbon in the pitch, (Daromatic/Daliphatic) is a ratio of the absorption intensity of an aromatic C—H stretching vibration, measured with FT-IR, to the absorption intensity of an aliphatic C—H stretching vibration, measured with FT-IR, x is an average number of hydrogen bonded to carbon other than aromatic carbon (x=2), and $\epsilon_{aliphatic}/\epsilon_{aromatic}$ is a specific extinction (=2).

According to the present invention 1, further, there is provided a carbon foam as recited above, wherein the mesophase pitch is a pitch obtained by polymerizing a fused polycyclic hydrocarbon or a substance containing a fused polycyclic hydrocarbon in the presence of hydrogen fluoride and boron trifluoride.

According to the present invention 1, further, there is provided a carbon foam as recited above, which is obtained by heat-treating the above mesophase pitch at a temperature of from 400° C. to 800° C. under the application of pressure of 0.1 MPa or more with an inert gas.

According to the present invention 1, further, there is provided a carbon foam which is obtained by further heat-treating the carbon foam obtained by the above heat-treatment at a temperature of from 600° C. to less than 2,000° C.

According to the present invention 1, further, there is provided a carbon foam as recited above, which has a bulk density of from 0.20 g/cm³ to 0.65 g/cm³ and has a density, measured using helium as a substitution medium, of from 1.3 g/cm³ to 1.5 g/cm³.

According to the present invention 1, further, there is provided a carbon foam as recited above, which has a porosity p of from 50% to 90% and an open cell rate of from 90% to 100%, the porosity p being represented by the formula (2), $$P = (1 - d/Dr) \times 100 \quad (2)$$

in which d is a bulk density and Dr is a density measured using helium as a substitution medium after the foam is pulverized to 150 microns or less, the open cell rate being represented by the formula (3), $$\phi = D/Dr \times 100 \quad (3)$$

in which D is a density measured using helium as a substitution medium and Dr has the same meaning as recited above.

According to the present invention 1, further, there is provided a graphite foam which is obtained by heat-treating the carbon foam recited above at a temperature of 2,000° C. or higher.

According to the present invention 1, further, there is provided a graphite foam as recited above, which has a bulk density of from 0.3 g/cm³ to 1.0 g/cm³ and has a density, measured using helium as a substitution medium, of 2.0 g/cm³ or more.

According to the present invention 1, further, there is provided a graphite foam as recited above, which has a porosity of from 50% to 90% and an open cell rate of from 90% to 100%.

According to the present invention 2, there is provided a carbon foam which is obtained by heat-treating, at a temperature of from 400° C. to 800° C. under the application of pressure of from 0.1 MPa to 5 MPa, preferably from 0.1 MPa to 4 MPa, more preferably from 0.1 MPa to 3 MPa, with an inert gas, at least one mesophase pitch selected from the group consisting of the following mesophase pitches a, b, c and d which are obtained by polymerizing a fused polycyclic hydrocarbon or a substance containing a fused polycyclic hydrocarbon in the presence of hydrogen fluoride and boron trifluoride as catalysts, a. a mesophase pitch having an aromatic carbon index fa value of from 0.90 to 0.97, which mesophase pitch is obtained by removing the catalysts after the polymerization and then heat-treating the resultant pitch at a maximum treatment temperature in the range of from 300° C. to 500° C., the aromatic carbon index fa being determined by the following formula (1), $$fa = 1 - (H/C)/x(1 + (Daromatic/Daliphatic) \times (\epsilon aliphatic/\epsilon aromatic)) \quad (1)$$

in which (H/C) is an atom ratio of hydrogen to carbon in the pitch, x is an average number of hydrogen bonded to carbon other than aromatic carbon (x=2), (Daromatic/Daliphatic) is a ratio of the absorption intensity (Daromatic) of an aromatic C—H stretching vibration, measured with FT-IR, to the absorption intensity (Daliphatic) of an aliphatic C—H stretching vibration, measured with FT-IR, and $\epsilon aliphatic/\epsilon aromatic$ is a specific extinction (=2), b. a mesophase pitch which is obtained by carrying out the polymerization in a catalyst molar ratio (fused polycyclic hydrocarbon/hydrogen fluoride/boron trifluoride) of hydrogen fluoride/fused polycyclic hydrocarbon=0.2~1.0 and boron trifluoride/fused polycyclic hydrocarbon=0.01~0.1 at a reaction temperature of from 100 to 350° C., removing the catalysts and then heat-treating the resultant pitch at a maximum treatment temperature in the range of from 300° C. to 500° C., c. a mesophase pitch having a fa value of from 0.90 to 0.97 and a softening point, determined with a flow tester, of 300° C. or less, which mesophase pitch is obtained by removing the catalysts from the mesophase pitch obtained by polymerizing in the same catalyst molar ratio as that in the above b and at the same reaction temperature as that in the above b and then heat-treating the resultant pitch at a maximum treatment temperature of from 400° C. to 500° C., and d. a mesophase pitch having a softening point of 250° C. or higher according to a flow tester, which mesophase pitch is obtained as a residue when at least one mesophase pitch obtained from the group consisting of the above a, b and c is extracted with a solvent.

According to the present invention 2, further, there is provided a process for the production of a carbon foam, comprising heat-treating at least one mesophase pitch selected from the group consisting of the above a, b, c and d at a temperature of from 400° C. to 800° C. under the application of pressure of from 0.1 MPa to 5 MPa, preferably from 0.1 MPa to 4 MPa, more preferably from 0.1 MPa to 3 MPa, with an inert gas.

According to the present invention 2, further, there is provided a process for the production of a carbon foam, comprising pulverizing at least one mesophase pitch selected from the group consisting of the above a, b, c and d, molding the pulverized mesophase pitch at a room temperature or under heat and then heat-treating the molded mesophase pitch at a temperature of from 400° C. to 800° C. under the application of pressure of from 0.1 MPa to 5 MPa, preferably from 0.1 MPa to 4 MPa, more preferably from 0.1 MPa to 3 MPa, with an inert gas.

According to the present invention 2, further, there is provided a carbon foam which is obtained by further heat-treating the carbon foam obtained from at least one mesophase pitch selected from the group consisting of the above a, b, c and d at a temperature of from 600° C. to less than 2,000° C. Owing to this treatment, a density, electrical physical properties and thermally physical properties can be controlled in proper ranges suited for an intended use.

According to the present invention 2, further, there is provided a process for the production of a carbon foam, which process comprises further heat-treating the above carbon foam at a temperature of from 600° C. to less than 2,000° C.

According to the present invention 2, further, there is provided a graphite foam having a bulk density of 0.30 g/cm³ or more, which is obtained by heat-treating the above carbon foam at a temperature of 2,000° C. or higher.

According to the present invention 2, further, there is provided a process for the production of a graphite foam, which process comprises heat-treating the above carbon foam at a temperature of 2,000° C. or higher.

DETAILED DESCRIPTION OF THE INVENTION

Figure 1:
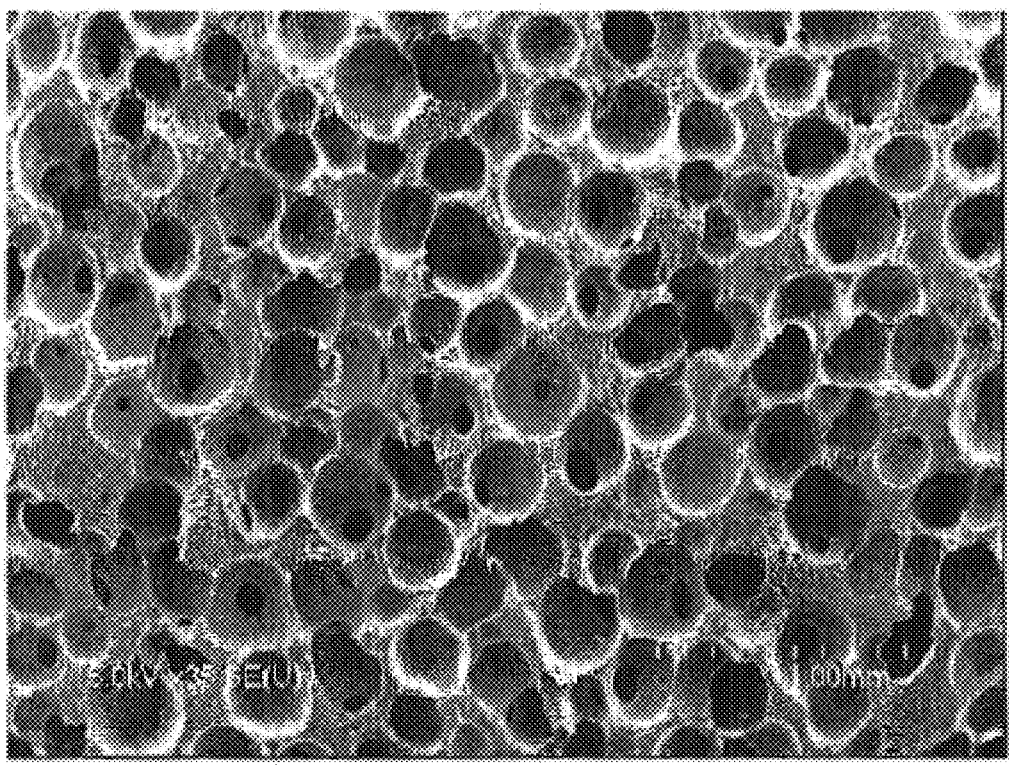
FIG. 1 is a photomicrograph of cross section of the carbon foam of Example 1 taken with SEM.

The present inventors have made diligent studies for overcoming the above problems and as a result found that a fine carbon foam can be obtained by heat-treating a specific mesophase pitch. The heat-treatment is preferably carried out under the application of pressure of 0.1 MPa or higher with an inert gas and at a temperature of from 400° C. to 800° C. The present inventors have found that a specific carbon foam having a uniform open cell structure can be accordingly industrially stably produced. Further, the present inventors have found that a specific graphite foam having a uniform open cell structure can be stably produced by further heat-treating the above carbon foam at a temperature of 2,000° C. or higher. On the basis of these findings, the present inventors have reached the present invention 1.

Further, the present inventors have found that a fine carbon foam can be produced by the use of a specific mesophase pitch, as a raw material, prepared from a pitch obtained by polymerizing a fused polycyclic hydrocarbon or a substance containing a fused polycyclic hydrocarbon in the presence of hydrogen fluoride and boron trifluoride as catalysts, even when the applied pressure with an inert gas when the carbon foam is produced by heat-treatment at a temperature of 400° C. or higher is 0.1 to 5 MPa, preferably 0.1 to 4 MPa, more preferably 0.1 to 3 MPa. On the basis of the above finding, the present inventors have reached the present invention 2.

Some of the above carbon foam can satisfy the requirement that the bulk density is 0.20 g/cm$^3$ or more.

Furthermore, the present inventors have found that a graphite foam having a bulk density of 0.30 g/cm$^3$ or more can be stably produced by heat-treating the above carbon foam at a temperature of 2,000° C. or higher. On the basis of the finding, the present inventors have reached the present invention 2.

Although the raw material mesophase pitch used in the present invention 1 may be a mesophase pitch of petroleum type, coal type or synthetic type, it is a mesophase pitch whose softening point is 300° C. or less according to a flow tester method, whose ratio (Daromatic/Daliphatic) of the absorption intensity of an aromatic C—H stretching vibration, measured with FT-IR, to the absorption intensity of an aliphatic C—H stretching vibration, measured with FT-IR, is 4.0 or less and whose optically anisotropic content is at least 80%.

Further, it is preferred to use a mesophase pitch having the above properties and having an aromatic carbon index fa value of from 0.80 to 0.97, the aromatic carbon index fa value being determined from (H/C) which is an atom ratio of hydrogen to carbon in the pitch and a ratio (Daromatic/Daliphatic) which is a ratio of the absorption intensity of an aromatic C—H stretching vibration, measured with FT-IR, to the absorption intensity of an aliphatic C—H stretching vibration, measured with FT-IR, by the formula (1) [fa=1−(H/C)×(1+(Daromatic/Daliphatic)×($\epsilon$aliphatic/$\epsilon$aromatic)), an average number of hydrogen bonded to carbon other than aromatic carbon x=2, and a specific extinction $\epsilon$aliphatic/$\epsilon$aromatic=2]. The above specific pitch is heat-treated under the application of a pressure of preferably 0.1 MPa or more with an inert gas at a temperature of from 400° C. to 800° C., whereby the carbon foam is produced.

Although the mechanism where the carbon foam having a uniform open cell structure is produced from the above specific pitch is not entirely obvious, the mechanism is estimated as follows. The pitch is converted into a high viscosity pitch due to a condensation reaction at a high temperature of 400° C. or higher and finally the pitch is solidified. A cracked gas generated in tandem with this works as a foaming agent to form a foam. Furthermore, it is estimated that a practical foam having a bulk density of at least a certain level can be produced when the above reaction is carried out under the application of a pressure with an inert gas.

When the pitch has a very high softening point of more than 300° C., the fluidity of the pitch during melting is poor in a foam-producing step to be described later. In this case, therefore, it is difficult to convert the pitch into a uniform block having no bubbles in a die before the formation of a foam so that voids which are a cause of a decrease in strength are apt to occur inside a foam as a product, which is not preferred industrially.

When the optically anisotropic content is less than 80%, cells of a foam generated become nonuniform. When the optically anisotropic content is less than 10%, i.e., a substantially isotropic pitch is used, a fine foam can not be produced from any of the types of a petroleum type, a coal type and a synthetic type.

When the ratio (Daromatic/Daliphatic) of the pitch, which is a ratio of the absorption intensity of an aromatic C—H stretching vibration, measured with FT-IR, to the absorption intensity of an aliphatic C—H stretching vibration, measured with FT-IR, is more than 4.0 and the aromatic carbon index fa value of the pitch is more than 0.97, the retentional amount of aliphatic hydrogen effective as a foaming agent in the pitch is assumed to be small, so that a fine cell structure can not be obtained.

On the other hand, when the pitch has an aromatic carbon index fa value of less than 0.80, industrially undesirably, a fine cell structure is not formed either and at the same time the carbonization yield is small.

Among the above-described pitches, it is preferred to use a mesophase pitch whose softening point is in the range of from 180° C. to 270° C. according to a flow tester method, whose ratio (Daromatic/Daliphatic) of the absorption intensity of an aromatic C—H stretching vibration, measured with FT-IR, to the absorption intensity of an aliphatic C—H stretching vibration, measured with FT-IR, is in the range of from 0.4 to 2.0, whose aromatic carbon index fa value is in the range of from 0.83 to 0.93 and whose optically anisotropic content is 100% in order to obtain the uniformity of cell structure of a carbon foam and at the same time to improve the productivity of a foam.

In the present invention 1 and the present invention 2, a synthetic mesophase pitch obtained by polymerizing a fused polycyclic hydrocarbon or a substance containing a fused polycyclic hydrocarbon in the presence of hydrogen fluoride and boron trifluoride is preferably used since it satisfies all the above conditions necessary to obtain a carbon foam having a fine cell structure and at the same time it has a high chemical purity, excellent graphitizing properties and a very high carbonization yield. Since the raw material of a known conventional mesophase pitch of petroleum type or coal type is a byproduct, the precise control of physical properties of a mesophase pitch, which precise control is to be done in the present invention, is difficult and the above known conventional mesophase pitch is poor in the stability of nature and has a lot of impurities such as metal contents. Therefore, the above known conventional mesophase pitch is not preferable.

The mesophase pitch used in the present invention 2 is at least one mesophase pitch selected from the group consisting of the following mesophase pitches a, b, c and d which are obtained by polymerizing a fused polycyclic hydrocarbon or a substance containing a fused polycyclic hydrocarbon in the presence of hydrogen fluoride and boron trifluoride as catalysts, a. a mesophase pitch having an aromatic carbon index fa value of from 0.90 to 0.97, which mesophase pitch is obtained by removing the catalysts after the polymerization and then heat-treating the resultant pitch at a maximum treatment temperature in the range of from 300° C. to 500° C. which is higher than a temperature condition of a general post treatment, the aromatic carbon index fa being determined by the following formula (1), $$fa=1-(H/C)/x(1+(D_{aromatic}/D_{aliphatic})\times(\epsilon_{aliphatic}/\epsilon_{aromatic}))  \quad (1)$$

in which (H/C) is an atom ratio of hydrogen to carbon in the pitch, x is an average number of hydrogen bonded to carbon other than aromatic carbon (x=2), (Daromatic/Daliphatic) is a ratio of the absorption intensity (Daromatic) of an aromatic C—H stretching vibration, measured with FT-IR, to the absorption intensity (Daliphatic) of an aliphatic C—H stretching vibration, measured with FT-IR, and ($\epsilon$aliphatic/$\epsilon$aromatic) is a specific extinction (=2), b. a mesophase pitch which is obtained by carrying out the polymerization in a catalyst molar ratio (fused polycyclic hydrocarbon/hydrogen fluoride/boron trifluoride) of hydrogen fluoride/fused polycyclic hydrocarbon=0.2~1.0 and boron trifluoride/fused polycyclic hydrocarbon=0.01~0.1 at a reaction temperature of from 100 to 350° C., removing the catalysts and then heat-treating the resultant pitch at a maximum treatment temperature in the range of from 300° C. to 500° C., c. a mesophase pitch having a fa value of from 0.90 to 0.97 and a softening point, determined with a flow tester, of 300° C. or less, which mesophase pitch is obtained by removing the catalysts from the mesophase pitch obtained by polymerizing in the same catalyst molar ratio as that in the above b and at the same reaction temperature as that in the above b and then heat-treating the resultant pitch at a maximum treatment temperature of from 400° C. to 500° C., and d. a mesophase pitch having a softening point of 250° C. or higher according to a flow tester, which mesophase pitch is obtained as a residue when at least one mesophase pitch obtained from the group consisting of the above a, b and c is extracted with a solvent.

The above mesophase pitch is suited for the production of a carbon foam having a bulk density of 0.20 g/cm³ or more.

The method of the above a in which the heat-treatment is carried out after the polymerization to obtain a mesophase pitch, is carried out by polymerizing a fused polycyclic hydrocarbon under an authigenic pressure in the presence of catalysts, then reducing the pressure to recover the catalysts, and heat-treating the resultant pitch at a maximum treatment temperature of 300° C. or higher. On this occasion, an inert gas such as nitrogen may be introduced similarly to a general light-contents-removing procedure. Further, there may be adopted a method in which light contents are removed, an obtained pitch is taken out for a while and the pitch is heat-treated under an inert gas atmosphere at a maximum treatment temperature of 300 to 500° C.

When the obtained mesophase pitch has an aromatic carbon index fa value of from 0.90 to 0.97, a carbon foam having a bulk density of 0.20 g/cm³ or more can be obtained by carrying out the heat-treatment under the application of a pressure of from 0.1 MPa to 5 MPa, preferably from 0.1 MPa to 4 MPa, more preferably from 0.1 MPa to 3 MPa, with an inert gas at a temperature of from 400° C. to 800° C. It is estimated that a pitch having an aromatic carbon index fa of more than 0.97 has a small retentional amount of aliphatic hydrogen effective as a foaming agent, so that a fine cell structure can not be obtained. On the other hand, except for the case using the pitch obtained by polymerizing under the specific catalyst condition described in the above b, a carbon foam having a bulk density of 0.20 g/cm³ or more can not be produced from a pitch having an aromatic carbon index fa of less than 0.90 under the application of a pressure of 3 MPa or less with an inert gas.

Although the method in which a mesophase pitch is produced under the reaction conditions of the above b (temperature, pressure and catalyst molar ratio) varies depending upon the size of a reactor or a feeding amount, an effective method is a method in which the molar ratio of boron trifluoride among the catalysts to naphthalene is decreased to 0.1 or less. In the method, the polymerization is carried out in a catalyst molar ratio (fused polycyclic hydrocarbon/hydrogen fluoride/boron trifluoride) of hydrogen fluoride/fused polycyclic hydrocarbon=0.2~1.0 and boron trifluoride/fused polycyclic hydrocarbon=0.01~0.1 at a reaction temperature of from 100 to 350° C., the catalysts are removed and then, the thus-obtained pitch is heat treated at a maximum treatment temperature in the range of 300 to 500° C. Although a mesophase pitch having an aromatic carbon index fa value of from 0.90 to 0.97 can not be obtained under the above reaction conditions in some cases, a carbon foam having a bulk density of 0.20 g/cm³ or more can be obtained under the application of pressure of 3 MPa with an inert gas.

When the polymerization is carried out under the catalyst condition of the above c and then the heat-treatment after the removal of the catalysts is carried out at a higher temperature side in the maximum treatment temperature range of 400 to 500° C., a mesophase pitch having a fa value of from 0.90 to 0.97, which is effective for increasing the bulk density of a foam, can be produced so that such meltability that the softening point determined with a flow tester is 300° C. or less can be maintained. For this reason, it is preferred in view of the production of a carbon foam having an arbitrary form by the use of a die. Further, there may be also adopted a method in which the polymerization is carried out at a reaction temperature of 200° C. or less, then, most of the catalysts are removed to decrease the percentage of the catalysts and then the reaction is further continued at a reaction temperature of 200° C. or higher to obtain a synthetic pitch.

In the method of the above d in which the residue generated through the solvent extraction of a synthetic pitch is used, the solvent for extraction is selected from various solvents such as hexane, benzene, toluene, pyridine, quinoline and chloroform, a tar wash oil and the like.

The method of heat-treating the specific pitch described before under the application of pressure of from 0.1 MPa to 5 MPa, preferably from 0.1 MPa to 4 MPa, more preferably from 0.1 MPa to 3 MPa, with an inert gas at a temperature of from 400° C. to 800° C., is not specially limited. According to the use of the mesophase pitch of the present invention, a carbon foam having a uniform open cell structure is relatively easily produced.

Further, the physical properties of a foam such as a cell structure or a bulk density can be controlled not only by the pressure with an inert gas or the temperature-increasing rate but also by combining the selection of a pitch with these production conditions.

The method of placing a mesophase pitch into a pressure vessel includes a method (A) in which a mesophase pitch in a powder, pellet or block state is placed in a metal vessel such as a vessel made of aluminum or a vessel made of stainless steel for forming a foam, a method (B) in which a mesophase pitch is placed in a metal vessel made of aluminum or stainless steel, the metal vessel is placed in a heating furnace, and the mesophase pitch is maintained under a nonoxidative atmosphere of a nitrogen current at a temperature higher than the softening point by approximately 100° C. for approximately 10 hours to convert the mesophase pitch into a uniform block containing almost no bubbles in the metal vessel, and a method (C) in which a pitch is pulverized and then molded at room temperature or under heat and then the molded pitch is placed in a vessel made of aluminum, stainless steel or the like.

Among the above methods, the method (C) in which a pitch is pulverized and then molded at room temperature or under heat and then the molded pitch is placed in a vessel is effective for obtaining a uniform carbon foam when the softening point of a raw material mesophase pitch which satisfies the parameter of the present invention is increased and therefore it is difficult to obtain a uniform block containing almost no bubbles in a metal vessel.

Although the method of heat-treating a mesophase pitch, which is pressure-increased to 0.1 MPa or higher by means of an inert gas, at a temperature of from 400° C. to 800° C. is not specially limited, for example, the following methods may be adopted.

A metal vessel containing a mesophase pitch is placed in a heatable pressure vessel, the atmosphere is replaced with a nitrogen atmosphere by a vacuum substitution, then, the temperature is increased up to 350° C. at a rate of 3° C./minute while keeping atmospheric pressure and the mesophase pitch is maintained for 1 hour. Then, the pressure is increased to 3.0 MPa with nitrogen while keeping the temperature of 350° C. and the temperature is increased up to 550° C. at a rate of 2° C./minute. The mesophase pitch is maintained for 1 hour in this state, then the heater is turned off, and the mesophase pitch in the metal vessel is allowed to cool naturally in the furnace. Thereafter, a sample is taken out and it is found that a carbon foam having a uniform cell structure and a bulk density of 0.20 g/cm$^3$ or more, as described above, is formed in the metal vessel. Further, the application of pressure with an inert gas can be initiated from a room temperature.

Depending upon an intended use, the obtained carbon foam can be successively heat-treated at a temperature of from 600° C. to less than 2,000° C. The pressure in this heat treatment may be a normal pressure or a pressurized pressure. Owing to the above heat-treatment, a density, electrical physical properties and thermally physical properties can be controlled in proper ranges.

Further, the above carbon foam is graphitized by heat-treating at a temperature of 2,000 or higher, whereby a graphite foam having a bulk density of 0.3 g/cm$^3$ or more is produced. In the graphitization, it is more preferred to preliminary heat-treat (calcinate) the carbon foam at a temperature of from 800° C. to less than 2,000° C. The above graphite foam can be a foam having high strength and high thermal conductivity.

The pitch specified by the present invention 1 is heat-treated under the application of a pressure of 0.1 MPa or more with an inert gas at a temperature of from 400° C. to 800° C., whereby there is produced a carbon foam which has a bulk density d of from 0.20 g/cm$^3$ to 0.65 g/cm$^3$, a density D, measured using helium as a substitution medium, of from 1.3 g/cm$^3$ to 1.5 g/cm$^3$, a porosity p of from 50% to 90% and an open cell rate of from 90% to 100%, and of which the optical texture of the carbon is substantially 100% anisotropic.

The porosity p is calculated from density Dr which is measured using helium as a substitution medium after the foam is pulverized to 150 microns or less and a bulk density d which is an apparent density per volume by the formula (2): $P=(1-d/Dr) \times 100$. Further, the open cell rate is calculated by the formula (3): $\phi = D/Dr \times 100$.

The carbon foam having the above specific values of physical properties has a uniform open cell structure, and there can be provided a novel carbon foam having uniform gas diffusivity into the foam or the like in addition to properties such as heat resistance, chemical stability, electrical conductivity and strength.

Further, the above carbon foam is graphitized by heat-treating at a temperature of 2,000 or higher, whereby there is produced a graphite foam having a bulk density of from 0.3 g/cm$^3$ to 1.0 g/cm$^3$, a density, measured using helium as a substitution medium, of from 2.0 g/cm$^3$ or more, a porosity of from 50% to 90% and an open cell rate of from 90% to 100%. A heat-treated carbon foam obtained by heat-treating the carbon foam at a temperature of from 400° C. to 2,000° C. before the graphitization may be used as a raw material for producing a graphite foam.

The mesophase pitch specified by the present invention 2 is heat-treated under the application of from 0.1 MPa to 5 MPa, preferably from 0.1 MPa to 4 MPa, more preferably from 0.1 MPa to 3 MPa, with an inert gas at a temperature of from 400° C. to 800° C., whereby a carbon foam having a bulk density of 0.20 g/cm$^3$ or more can be obtained. Further, the above carbon foam is furthermore heat-treated at a temperature of 2,000° C. or higher, whereby a graphite foam having a bulk density of 0.3 g/cm$^3$ or more can be produced.

The graphite foam having the above specific values of physical properties has high thermal conductivity in addition to a uniform open cell structure, heat resistance, chemical stability, electrical conductivity, strength and gas diffusivity which the carbon foam of the present invention has, since it is derived from an excellent easy-to-graphitize carbon.

EFFECT OF THE INVENTION

As described in detail above, owing to the use of the raw material pitch based on the present invention 1, there can be industrially stably produced a carbon foam having a uniform open cell structure. Further, owing to the use of the raw material pitch based on the present invention 2, there can be produced a carbon foam having a uniform open cell structure at such a pressure of 5 MPa or less, preferably 4 MPa or less, more preferably 3 MPa or less, that an operation can be industrially stably performed. Further, a graphite foam having a uniform open cell structure together with a high graphitization degree can be industrially stably produced by graphitizing the above carbon foam at 2,000° C. or higher.

EXAMPLES

The present invention will be explained more in detail with reference to Examples and Comparative Examples hereinafter. The present invention shall not be limited to these Examples. Further, the method of analyzing a pitch and a foam in the present Examples will be described below.

(Softening Point)

The softening point was measured with an elevated flow tester supplied by SHIMADZU CORPORATION. A cylinder having a sectional area of 1 cm² and having a nozzle having a diameter of 1 mm at a bottom was charged with 2 g of a sample which had been pulverized to 300 microns or less and the temperature was increased at a rate of 5° C./minute while applying a pressure of 9.8 N/cm² (10 kg/cm²). Powder particles softened with increasing the temperature, to increase the filling rate and to decrease the volume of the sample powder. However, the volume decrease stopped when the temperature exceeded a certain temperature. When the temperature-increase was further continued, the sample melted and flowed out from the nozzle. In this case, the temperature at which the volume decrease of the sample powder stopped was defined as a softening point.

(Elemental Analysis)

For calculating the atom ratio (H/C) of hydrogen to carbon, carbon and hydrogen were simultaneously analyzed with a 2400CHN-model elemental analyzer supplied by PERKINELMER as an analyzer. The measurement was carried out by a method in which 1.5±0.2 mg of a sample pitch was weighed and placed in a container made of tin, the sample pitch in the container was set in the analyzer, then the sample pitch was burned at 975° C. for 5 minutes, and carbon and hydrogen in the sample pitch were detected and measured by TCD with a He gas carrier. In the measurement of the sample, a correction was carried out with acetanilide (2.0±0.1 mg) as a reference material in advance.

(FT-IR)

1 part of a modified pitch powder was added to 100 parts of a KBr powder, these powders were mixed on an agate mortar, then the resultant mixture was set in FT/IR-410 supplied by Nippon Bunko K.K., a diffuse reflectance spectroscopy measuring device DR-81, and then the measurement was carried out. The Kubelka-Munk conversion of the obtained diffused reflection spectrum was carried out to obtain a spectrum. A ratio (Daromatic/Daliphatic) of a peak intensity around 3,050 cm⁻¹ (absorption intensity of an aromatic C—H stretching vibration) to a peak intensity around 2,930 cm⁻¹ (absorption intensity of an aliphatic C—H stretching vibration) in the spectrum was obtained.

(Density Measurement)

The density using helium as a substitution medium was measured with a micropycnometer supplied by Quantachrome. A sample was dried at 120° C. for 2 hours.

Example 1

Naphthalene was polymerized in the presence of a superacid catalyst $HF-BF_3$ to obtain a raw material pitch (catalyst molar ratio: naphthalene/HF/$BF_3$=1/0.35/0.15, reaction temperature: 265° C.). The softening point of the above pitch according to a flow tester was 227° C. The atom ratio (H/C) of hydrogen to carbon was 0.606. The ratio (Daromatic/Daliphatic) of the absorption intensity of an aromatic C—H stretching vibration, measured with FT-IR, to the absorption intensity of an aliphatic C—H stretching vibration, measured with FT-IR, was 0.507. The aromatic carbon index fa value calculated by the formula (1) was 0.85. The optically anisotropic content of the pitch according to an observation with a polarization microscopy was 100%, and the pitch was a mesophase pitch.

2 g of the above mesophase pitch was placed in a cylindrical vessel which was made of aluminum and had an internal diameter of 13 mm, a depth of 29.15 mm and an internal volume of 4.17 cm³ and of which the weight had been already known. The mesophase pitch in the vessel was placed in a heating furnace, the mesophase pitch was maintained under a nonoxidative atmosphere of a nitrogen current at a temperature (327° C. in the present Example) higher than the softening point by 100° C. for 10 hours. The mesophase pitch was melted by the heating and formed into a uniform block containing almost no bubbles in the aluminum vessel.

Then, the aluminum vessel containing the pitch was placed in an airtight container made of SUS and having an outer diameter of 25 mm, an internal diameter of 20 mm and a length of 160 mm. The airtight container made of SUS was set in the center of a crucible furnace equipped with a thermoregulator and having an internal diameter of 105 mm. The atmosphere in the airtight container was changed to a nitrogen atmosphere by a vacuum substitution. The temperature was increased up to 350° C. at a rate of 3° C./minute with retaining atmospheric pressure, and the mesophase pitch was maintained for 1 hour in this state. Then, the pressure was increased to 6.5 MPa with nitrogen while keeping the temperature of 350° C. and then the temperature was increased up to 550° C. at a rate of 2° C./minute. The pressure at 550° C. was 8.6 MPa. The mesophase pitch was maintained for 1 hour in this state, then the heater was turned off, and the airtight container made of SUS was allowed to cool naturally in the furnace. Thereafter, a sample was taken out and it was found that the pitch was foamed and carbonized in the aluminum vessel to form a carbon foam.

After the carbon foam in the aluminum vessel was estimated for bulk density, the carbon foam was cut with a diamond cutter to obtain a sample, and the sample was measured for a density using helium. As a result, the bulk density was 0.43 g/cm³ and the density measured using helium as a substitution medium was 1.40 g/cm³. Further, a carbon foam separately prepared in the same manner as above was pulverized to 150 microns or less and then measured for a density Dr using helium as a substitution medium. The density Dr was 1.44 g/cm³. Therefore, the porosity was calculated to find that it was 70%. And the open cell rate was calculated to find that it was 97%. Further, the carbon foam was observed through a polarization microscope by a conventional method to find that the optical texture of the carbon constituting the foam was 100% anisotropic. Further, the cross section of the foam was observed with SEM and it was found that the carbon foam was a fine carbon foam having a very uniform cell shape as shown in FIG. 1.

The carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to form a graphite foam. The graphite foam had a bulk density of 0.55 g/cm³, and the density measured using helium as a substitution medium was 2.185 g/cm³. A graphite foam separately prepared in the same manner as above was pulverized to 150 microns or less and then measured for a density Dr using helium as a substitution medium. The density Dr was 2.230 g/cm³. Therefore, the porosity was calculated to find that the graphite foam had a porosity of 75%. And the open cell rate was calculated to find that the graphite foam had an open cell rate of 98%. The crystal structure of the graphite foam powder was analyzed by an X-ray diffraction method (method of the Japan Society for Promotion of Scientific Research). As a result of the analysis, the spacing d002 of crystallite on the surface (002) was 0.3359 nm, the size Lc of crystallite was 120 nm, and the graphite foam had a high graphitization degree. Table 1 shows the results.

Example 2

The same raw material pitch as that in Example 1 was used, and an investigation was carried out in the same manner as in Example 1 except that the pressure was increased to 3.5 MPa with nitrogen while keeping the temperature of 350° C. and the temperature was increased up to 550° C. at a rate of 2° C./minute. Tables 1 and 2 show the results.

Examples 3 and 4

An investigation was carried out in the same manner as in Example 1 or Example 2 except that a raw material pitch was synthesized in a catalyst ratio of naphthalene/HF/BF$_3$= 1/0.32/0.074 at a synthetic temperature of 245° C. Table 1 shows the results.

Example 5

An investigation was carried out in the same manner as in Example 1 except that a raw material pitch was synthesized in a catalyst ratio of naphthalene/HF/BF$_3$=1/0.70/0.20 at a synthetic temperature of 285° C. Table 1 shows the results.

Example 6

An investigation was carried out in the same manner as in Example 1 except that a raw material pitch was synthesized from mixed methyl naphthalene as a raw material in a catalyst ratio of naphthalene/HF/BF$_3$=1/0.45/0.15 at a synthetic temperature of 253° C. Table 2 shows the results.

Example 7

10 g of the same pitch as that synthesized in Example 1 was placed in a 100-cc beaker, the 100-cc beaker was placed in a muffle furnace in which a nonoxidative atmosphere was kept, the temperature was increased up to 425° C. at a rate of 250° C./hour, and then the pitch was maintained for 1 hour in this state. After cooling to 100° C. or lower, the pitch in the beaker was taken out. The yield was 95.5%. The thus-obtained pitch was used as a raw material, and a foam production and an investigation were carried out in the same manner as in Example 1. Table 2 shows the results.

Example 8

An investigation was carried out in the same manner as in Example 1 except that the raw material pitch was replaced with a petroleum type mesophase pitch. Table 2 shows the results.

Example 9

An investigation was carried out in the same manner as in Example 2 except that the raw material pitch was replaced with a coal type mesophase pitch. Table 2 shows the results.

Example 10

An investigation was carried out in the same manner as in Example 2 except that the raw material pitch was replaced with a coal type mesophase pitch. Table 2 shows the results.

Comparative Example 1

A raw material pitch (coal-tar type mesophase pitch) had the following properties. The softening point according to a flow tester was 176° C. The atom ratio (H/C) of hydrogen to carbon was 0.424. The ratio (Daromatic/Daliphatic) of the absorption intensity of an aromatic C—H stretching vibration, measured with FT-IR, to the absorption intensity of an aliphatic C—H stretching vibration, measured with FT-IR, was 5.80. The aromatic carbon index fa value calculated by the formula (1) was 0.983. The optically anisotropic content according to an observation with a polarization microscopy was 80%.

Figure 3:
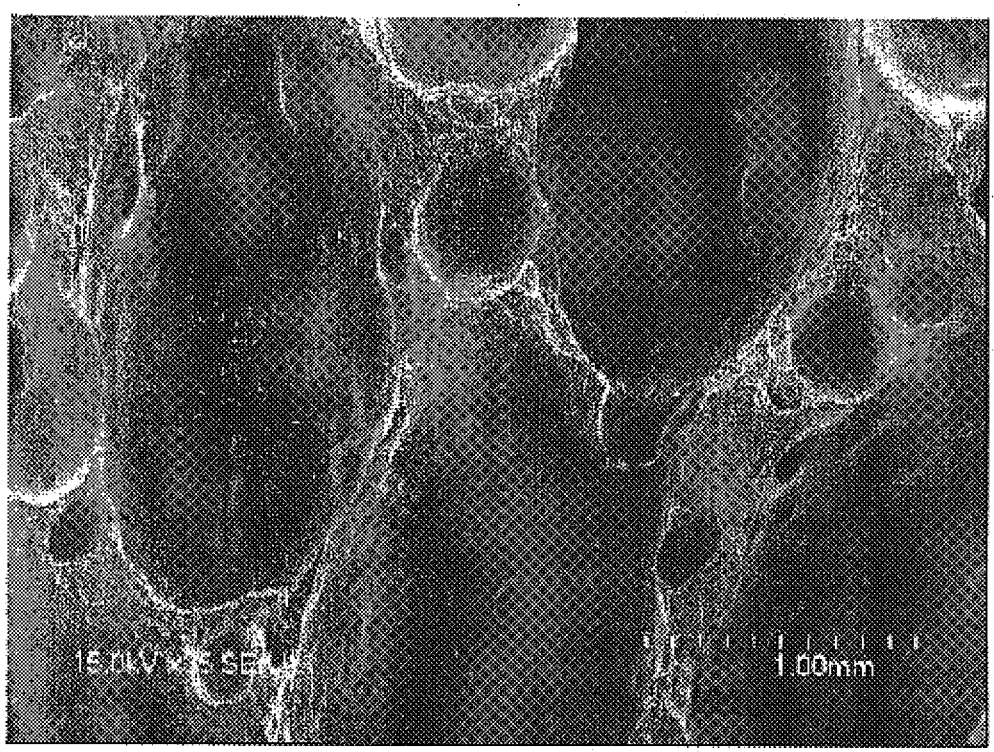
FIG. 3 is a photomicrograph of cross section of the carbon foam of Comparative Example 1 taken with SEM.

A carbon foam was produced from the above mesophase pitch as a raw material in the same manner as in Example 1. The bulk density was 0.50 g/cm³ and the density measured using helium as a substitution medium was 1.32 g/cm³. A carbon foam separately prepared in the same manner as above was pulverized to 150 microns or less and then measured for a density Dr using helium as a substitution medium. The density Dr was 1.48 g/cm³. Therefore, the porosity was 66%. However, the carbon foam had a low open cell rate of 89%. Further, the carbon foam was observed through a polarization microscope by a conventional method to find that the optical texture of the carbon constituting the foam was 100% anisotropic. However, the cross section of the foam was observed with SEM and it was found that the carbon foam had nonuniform cells as shown in FIG. 3. Table 3 shows the results.

Comparative Example 2

Naphthalene was polymerized in the presence of a superacid catalyst HF-BF$_3$ (catalyst molar ratio: naphthalene/HF/BF$_3$=1/0.70/0.20, reaction temperature: 120° C.) to obtain a raw material pitch. The softening point of the above pitch according to a flow tester was 93° C. The atom ratio (H/C) of hydrogen to carbon was 0.75. The ratio (Daromatic/Daliphatic) of the absorption intensity of an aromatic C—H stretching vibration, measured with FT-IR, to the absorption intensity of an aliphatic C—H stretching vibration, measured with FT-IR, was 0.256. The aromatic carbon index fa value calculated by the formula (1) was 0.752. The optically anisotropic content of the pitch according to an observation with a polarization microscopy was 0%, and the pitch was an isotropic pitch.

Figure 4:
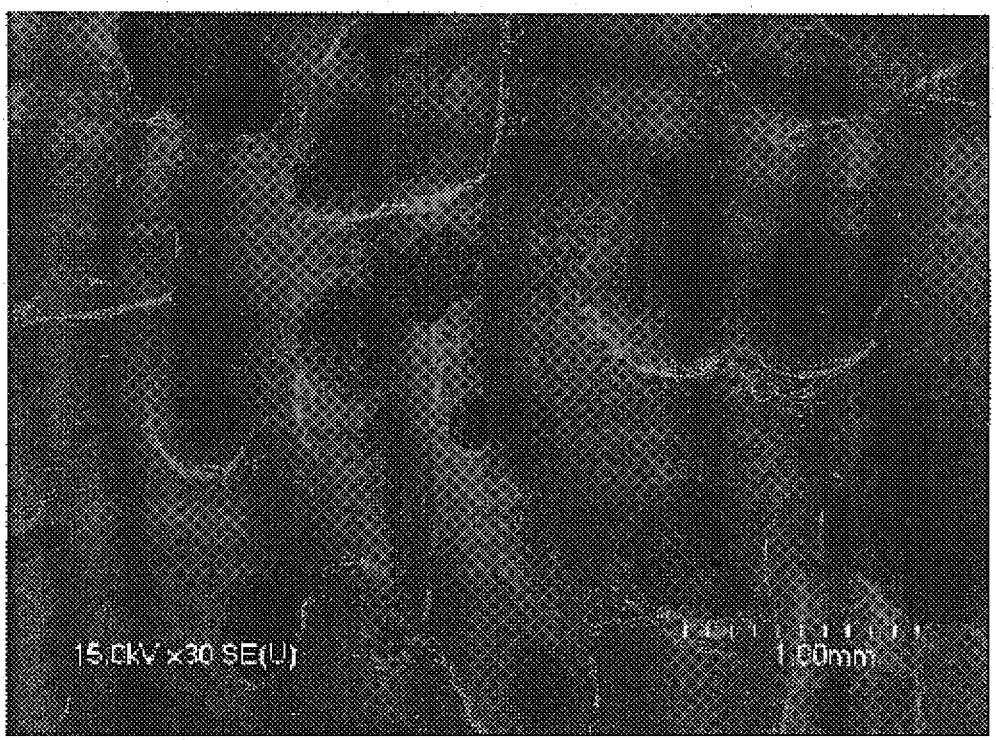
FIG. 4 is a photomicrograph of cross section of the carbon foam of Comparative Example 2 taken with SEM.

A carbon foam was produced from the above mesophase pitch as a raw material in the same manner as in Example 1. The bulk density was 0.48 g/cm³ and the density measured using helium as a substitution medium was 1.33 g/cm³. A carbon foam separately prepared in the same manner as above was pulverized to 150 microns or less and then measured for a density Dr using helium as a substitution medium. The density Dr was 1.43 g/cm³. Therefore, the porosity was 66% and the open cell rate was 93%. Further, the carbon foam was observed through a polarization microscope by a conventional method to find that the optical texture of the carbon constituting the foam was 100% anisotropic. However, the cross section of the foam was observed with SEM, to find that the carbon foam had nonuniform cells as shown in FIG. 4. Table 3 shows the results.

Comparative Example 3

An investigation was carried out in the same manner as in Example 1 except that the raw material pitch was replaced with a petroleum type mesophase pitch. Table 3 shows the results.

Comparative Example 4

An investigation was carried out in the same manner as in Example 1 except that the raw material pitch was replaced with a coal-tar pitch. Table 3 shows the results.

TABLE 1

| Examples | 1, 2 | 3, 4 | 5 |
|---|---|---|---|
| Raw material | naphthalene | naphthalene | naphthalene |
| Synthetic temperature (° C.) | 265 | 245 | 285 |
| Catalyst ratio in synthesis | 1/0.35/0.15 | 1/0.32/0.074 | 1/0.7/0.20 |
| Softening point (° C.) | 227 | 220 | 255 |
| H/C | 0.606 | 0.590 | 0.593 |
| Daroma/Dalipha | 0.507 | 0.576 | 0.516 |
| fa | 0.850 | 0.863 | 0.854 |
| anisotropic content (%) | 100 | 100 | 100 |

Figure 2:
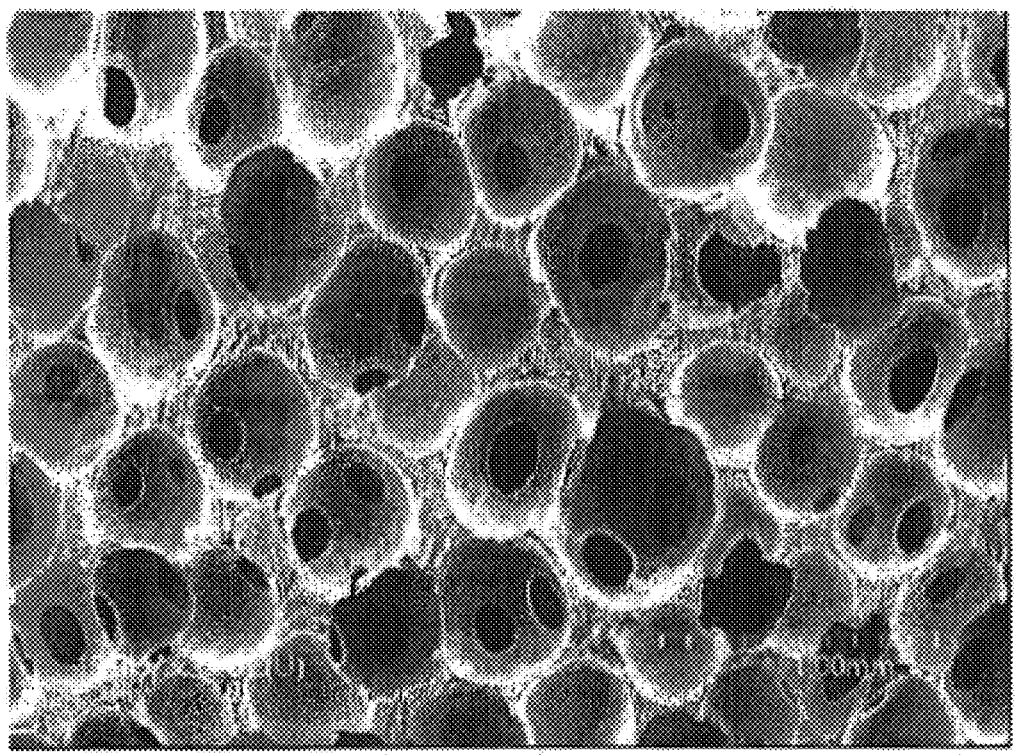
FIG. 2 is a photomicrograph of cross section of the carbon foam of Example 2 taken with SEM.

| Examples | 1 | 2 | 3 | 4 | 5 |
|---|---|---|---|---|---|
| Carbon foam | | | | | |
| Pressure (350° C., MPa) | 6.5 | 3.5 | 6.5 | 3.5 | 6.5 |
| Bulk density d (g/cm$^3$) | 0.43 | 0.27 | 0.47 | 0.32 | 0.49 |
| He density D (g/cm$^3$) | 1.40 | 1.41 | 1.38 | 1.36 | 1.38 |
| True density Dr (g/cm$^3$) | 1.44 | 1.44 | 1.44 | 1.44 | 1.44 |
| Porosity p (%) | 70 | 81 | 67 | 78 | 66 |
| Open cell rate $\phi$ (%) | 97 | 98 | 96 | 94 | 96 |
| Cross section of foam | Uniform (FIG. 1) | Uniform (FIG. 2) | Uniform | Uniform | uniform |
| Graphite foam | | | | | |
| Bulk density d (g/cm$^3$) | 0.55 | 0.35 | 0.59 | 0.41 | 0.59 |
| He density D (g/cm$^3$) | 2.18 | 2.17 | 2.22 | 2.20 | 2.19 |
| True density Dr (g/cm$^3$) | 2.23 | 2.23 | 2.23 | 2.23 | 2.23 |
| Porosity p (%) | 75 | 84 | 74 | 82 | 74 |
| Open cell rate $\phi$ (%) | 98 | 97 | 99 | 99 | 98 |

Daroma/Dalipha = Daromatic/Daiphatic

TABLE 2

| Examples | 6 | 7 | 8 | 9 | 10 |
|---|---|---|---|---|---|
| Raw material | Methyl naphthalene | Synthetic pitch in Example 1 | Petroleum type mesophase pitch | Coal type mesophase pitch | Coal type mesophase pitch |
| Synthetic temperature (° C.) | 253 | 425 | — | — | — |
| Catalyst ratio in synthesis | 1/0.45/0.15 | — | — | — | — |
| Softening point (° C.) | 216 | 260 | 242 | 252 | 238 |
| H/C | 0.625 | 0.558 | 0.526 | 0.497 | 0.482 |
| Daroma/Dalipha | 0.564 | 0.973 | 2.488 | 3.630 | 4.000 |
| fa | 0.853 | 0.905 | 0.956 | 0.970 | 0.973 |
| anisotropic content (%) | 100 | 100 | 100 | 100 | 100 |
| Carbon foam | | | | | |
| Pressure (350° C., MPa) | 6.5 | 6.5 | 6.5 | 3.5 | 3.5 |
| Bulk density d (g/cm$^3$) | 0.47 | 0.48 | 0.61 | 0.53 | 0.54 |
| He density D (g/cm$^3$) | 1.37 | 1.36 | 1.36 | 1.41 | 1.43 |
| True density Dr (g/cm$^3$) | 1.44 | 1.44 | 1.45 | 1.45 | 1.45 |
| Porosity p (%) | 67 | 67 | 58 | 63 | 63 |
| Open cell rate $\phi$ (%) | 95 | 94 | 94 | 97 | 98 |
| Cross section of foam | Uniform | Uniform | Uniform | Uniform | uniform |
| Graphite foam | | | | | |
| Bulk density d (g/cm$^3$) | 0.56 | 0.58 | 0.72 | 0.67 | 0.69 |
| He density D (g/cm$^3$) | 2.15 | 2.18 | 2.13 | 2.16 | 2.18 |
| True density Dr (g/cm$^3$) | 2.23 | 2.23 | 2.23 | 2.23 | 2.23 |
| Porosity p (%) | 75 | 74 | 68 | 70 | 69 |
| Open cell rate $\phi$ (%) | 96 | 98 | 96 | 97 | 98 |

Daroma/Dalipha = Daromatic/Daiphatic

TABLE 3

| Comparative Examples | 1 | 2 | 3 | 4 |
|---|---|---|---|---|
| Raw material | Coal-tar type mesophase pitch | naphthalene | Petroleum pitch | Coal-tar pitch |
| Synthetic temperature (° C.) | — | 120 | — | — |
| Catalyst ratio in synthesis | — | 1/0.70/0.20 | — | — |
| Softening point (° C.) | 176 | 93 | 85 | 80 |
| H/C | 0.424 | 0.750 | 0.715 | 0.550 |
| Daroma/Dalipha | 5.80 | 0.256 | 0.762 | 2.71 |
| fa | 0.983 | 0.752 | 0.858 | 0.957 |
| anisotropic content (%) | 80 | 0 | 0 | 0 |
| Carbon foam | | | | |
| Pressure (350° C., MPa) | 6.5 | 6.5 | 6.5 | 6.5 |
| Bulk density d (g/cm$^3$) | 0.50 | 0.48 | 0.47 | 0.47 |
| He density D (g/cm$^3$) | 1.32 | 1.33 | 1.29 | 1.35 |
| True density Dr (g/cm$^3$) | 1.48 | 1.43 | 1.45 | 1.48 |
| Porosity p (%) | 66 | 66 | 68 | 68 |
| Open cell rate $\phi$ (%) | 89 | 93 | 89 | 91 |
| Cross section of foam | Nonuniform (FIG. 3) | Nonuniform (FIG. 4) | Nonuniform | Nonuniform |

Daroma/Dalipha = Daromatic/Daiphatic

Example 11

Naphthalene was polymerized at a reaction temperature of 270° C. under an authigenic pressure in the presence of a superacid catalyst $HF-BF_3$ (catalyst molar ratio: naphthalene/$HF/BF_3$=1/0.35/0.15), then, the pressure was reduced to recover the catalysts, and further, nitrogen was introduced at 350° C. for 10 hours to remove light contents, whereby there was obtained a mesophase pitch having a softening point of 230° C. according to a flow tester. The above mesophase pitch was further heat-treated at 470° C. for 0.5 hour to obtain a heat-treated mesophase pitch having a softening point of 295° C. according to a flow tester, a (H/C) of 0.526, a (Daromatic/Daliphatic) of 1.34 and an aromatic carbon index fa value of 0.929.

8 g of the heat-treated mesophase pitch was placed in a cylindrical vessel which was made of aluminum and had an internal diameter of 31 mm, a depth of 40 mm and an internal volume of 30.175 $cm^3$, the cylindrical vessel was placed in an airtight container made of SUS and having an outer diameter of 50 mm, an internal diameter of 35 mm and a length of 450 mm. The airtight container made of SUS was set in the center of a crucible furnace equipped with a thermoregulator and having an internal diameter of 55 mm. The atmosphere in the airtight container was changed to a nitrogen atmosphere by a vacuum substitution. Then, the temperature was increased up to 350° C. at a rate of 3° C./minute with retaining atmospheric pressure, and the heat-treated mesophase pitch was maintained for 1 hour in this state. Then, the pressure was increased to 3.0 MPa, and then the temperature was increased up to 550° C. at a rate of 2° C./minute while keeping the pressure of 3 MPa. The heat-treated mesophase pitch was maintained for 1 hour in this state. Then, the heater was turned off, and the airtight container made of SUS was allowed to cool naturally in the furnace. Thereafter, a sample was taken out and it was found that the pitch was foamed and carbonized in the aluminum vessel to form a carbon foam. The carbon foam in the aluminum vessel had a bulk density of 0.36 $g/cm^3$.

The carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to form a graphite foam. The graphite foam had a bulk density of 0.47 $g/cm^3$. Table 4 shows the results.

Example 12

The same mesophase pitch as that used in Example 11 was heat-treated at 475° C. for 0.5 hour, to obtain a heat-treated mesophase pitch having a softening point of 300° C. or higher according to a flow tester, a (H/C) of 0.492, a (Daromatic/Daliphatic) of 1.806 and an aromatic carbon index fa value of 0.947.

The heat-treated mesophase pitch was pulverized with a coffee mill, 8 g of the pulverized mesophase pitch was pressure-formed under 3 MPa to obtain a disk pitch molded material having a diameter of 28 mm and a thickness of 13 mm and having a bulk density of 1.1 $g/cm^3$. The pitch molded material was placed in a cylindrical vessel which was made of aluminum and had an internal diameter of 31 mm, a depth of 40 mm and an internal volume of 30.175 $cm^3$, and the cylindrical vessel was placed in the same airtight container made of SUS as that used in Example 1. The atmosphere in the airtight container was changed to a nitrogen atmosphere by a vacuum substitution. Then, the pressure was increased to 3.0 MPa at room temperature. The temperature was increased up to 550° C. at a rate of 2° C./minute while keeping the pressure of 3 MPa, and the pitch molded material was maintained for 1 hour in this state, to form a carbon foam. The carbon foam had a bulk density of 0.50 $g/cm^3$. Table 4 shows the results.

The carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to form a graphite foam. The graphite foam had a bulk density of 0.62 $g/cm^3$. Table 4 shows the results.

Example 13

Naphthalene was polymerized at a reaction temperature of 245° C. under an authigenic pressure in the presence of a superacid catalyst $HF-BF_3$ (catalyst molar ratio: naphthalene/$HF/BF_3$=1/0.32/0.074), then, the pressure was reduced to recover the catalysts, and further, nitrogen was introduced at 350° C. for 20 hours to remove light contents, to obtain a mesophase pitch. The mesophase pitch had a softening point of 220° C. according to a flow tester, a (H/C) of 0.590, a (Daromatic/Daliphatic) of 0.576 and an aromatic carbon index fa value of 0.863.

A carbon foam was produced in the same manner as in Example 11. The carbon foam had a bulk density of 0.25 $g/cm^3$.

The carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to form a graphite foam. The graphite foam had a bulk density of 0.35 $g/cm^3$. Table 4 shows the results.

Example 14

Naphthalene was polymerized under the same conditions as those in Example 13, then, the pressure was reduced to recover the catalysts, and further, nitrogen was introduced at 350° C. for 2 hours to obtain a mesophase pitch having an anisotropic content of 70%. The above mesophase pitch was heat-treated at 450° C. for 1 hour to obtain a heat-treated mesophase pitch having a softening point of 234° C. according to a flow tester, a (H/C) of 0.550, a (Daromatic/Daliphatic) of 1.68 and an aromatic carbon index fa value of 0.937. A carbon foam was produced in the same manner as in Example 1. The carbon foam had a bulk density of 0.28 $g/cm^3$.

The above carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to form a graphite foam. The graphite foam had a bulk density of 0.36 $g/cm^3$. Table 5 shows the results.

Example 15

The same mesophase pitch as that used in Example 11 was pulverized with a coffee mill and a solvent extraction was carried out with a toluene solvent by means of a Soxhlet extractor. The extraction residue was an extraction mesophase pitch having a softening point of 300° C. or higher according to a flow tester, a (H/C) of 0.621, a (Daromatic/Daliphatic) of 0.596 and an aromatic carbon index fa value of 0.858.

The powder of the extraction mesophase pitch was placed in a cylindrical vessel which was made of aluminum and had an internal diameter of 31 mm, a depth of 40 mm and an internal volume of 30.175 cm³, the cylindrical vessel was placed in the same airtight container made of SUS as that used in Example 11. The atmosphere in the airtight container was changed to a nitrogen atmosphere by a vacuum substitution. Then, the pressure was increased to 3.0 MPa at room temperature. The temperature was increased up to 550° C. at a rate of 2° C./minute while keeping the pressure of 3 MPa. The extraction mesophase pitch powder was maintained for 1 hour in this state, to form a carbon foam. The carbon foam had a bulk density of 0.26 g/cm³. The above carbon foam was temperature-increased under a nitrogen atmosphere at a rate of 10° C./hour. After the temperature reached to 1,000° C., the temperature was maintained for 2 hours to calcinate the carbon foam. Successively, the carbon foam was temperature-increased under an argon atmosphere at a rate of 500° C./hour. At 2,800° C., a graphitization treatment was carried out for 1 hour, to prepare a graphite foam. The graphite foam had a bulk density of 0.34 g/cm³. Table 5 shows the results.

TABLE 4

|  | Example 11 | Example 12 | Example 13 |
|---|---|---|---|
| Raw material | naphthalene | naphthalene | naphthalene |
| Synthetic temperature (° C.) | 265 | 265 | 245 |
| Catalyst ratio in synthesis (raw material/HF/BF₃) | 1/0.35/0.15 | 1/0.35/0.15 | 1/0.32/0.074 |
| Post treatment (1) | 350° C.-10 hours nitrogen | 350° C.-10 hours nitrogen | 350° C.-20 hours nitrogen |
| Post treatment (2) | 470° C.-0.5 hour | 475° C.-0.5 hour | Nil |
| Extraction with toluene | Nil | Nil | Nil |
| Softening point (° C.) | 295° C. | 300° C. or higher | 220° C. |
| H/C | 0.526 | 0.492 | 0.590 |
| Daroma/Dalipha | 1.341 | 1.806 | 0.576 |
| fa | 0.929 | 0.947 | 0.863 |
| Carbon foam |  |  |  |
| Pressure (MPa) | 3.0 | 3.0 | 3.0 |
| Bulk density d (g/cm³) | 0.36 | 0.50 | 0.25 |
| Graphite foam |  |  |  |
| Bulk density d (g/cm³) | 0.47 | 0.62 | 0.35 |

Daroma/Dalipha = Daromatic/Daiphatic

TABLE 5

|  | Example 14 | Example 15 |
|---|---|---|
| Raw material | naphthalene | naphthalene |
| Synthetic temperature (° C.) | 245 | 265 |
| Catalyst ratio in synthesis | 1/0.32/0.074 | 1/0.35/0.15 |

TABLE 5-continued

|  | Example 14 | Example 15 |
|---|---|---|
| (raw material/HF/BF₃) |  |  |
| Post treatment (1) | 350° C.-2 hours nitrogen | 350° C.-10 hours nitrogen |
| Post treatment (2) | 450° C.-1 hour | Nil |
| Extraction with toluene | Nil | Carried out |
| Softening point (° C.) | 234 | 300° C. or higher |
| H/C | 0.550 | 0.621 |
| Daroma/Dalipha | 1.68 | 0.596 |
| fa | 0.937 | 0.858 |
| Carbon foam |  |  |
| Pressure (MPa) | 3.0 | 3.0 |
| Bulk density d (g/cm³) | 0.28 | 0.26 |
| Graphite foam |  |  |
| Bulk density d (g/cm³) | 0.36 | 0.34 |

Daroma/Dalipha = Daromatic/Daiphatic

What is claimed is:

1. A carbon foam which is obtained by heat-treating a mesophase pitch whose softening point is 300° C. or less according to an elevated flow tester, whose ratio (Daromatic/Daliphatic) of the absorption intensity of an aromatic C—H stretching vibration, measured with FT-IR, to the absorption intensity of an aliphatic C—H stretching vibration, measured with FT-IR, is 4.0 or less and whose optically anisotropic content is at least 80%.

2. A carbon foam according to claim 1, wherein the mesophase pitch has an aromatic carbon index fa value of from 0.80 to 0.97, the aromatic carbon index fa value being represented by the formula (1), $$fa = 1 - (H/C)/x(1 + (Daromatic/Daliphatic) \times (\epsilon aliphatic/\epsilon aromatic))\ (1)$$

in which (H/C) is an atom ratio of hydrogen to carbon in the pitch, (Daromatic/Daliphatic) is a ratio of the absorption intensity of an aromatic C—H stretching vibration, measured with FT-IR, to the absorption intensity of an aliphatic C—H stretching vibration, measured with FT-IR, x is an average number of hydrogen bonded to carbon other than aromatic carbon (x=2), and ($\epsilon$aliphatic/$\epsilon$aromatic) is a specific extinction (=2).

3. A carbon foam according to claim 1, wherein the mesophase pitch is obtained by polymerizing a fused polycyclic hydrocarbon or a substance containing a fused polycyclic hydrocarbon in the presence of hydrogen fluoride and boron trifluoride.

4. A carbon foam according to claim 1, wherein the heat treatment is carried out at a temperature of from 400° C. to 800° C. under the application of pressure of 0.1 MPa or more with an inert gas.

5. A carbon foam according to claim 1, wherein the carbon foam recited in claim 4 is further heat-treated at a temperature of from 600° C. to less than 2,000° C.

6. A carbon foam according to claim 1, which has a bulk density of from 0.20 g/cm³ to 0.65 g/cm³ and has a density, measured using helium as a substitution medium, of from 1.3 g/cm³ to 1.5 g/cm³.

7. A carbon foam according to claim 1, which has a porosity p of from 50% to 90% and an open cell rate of from 90% to 100%, the porosity p being represented by the formula (2), $$P = (1-d/Dr) \times 100 \qquad (2)$$

in which d is a bulk density and Dr is a density measured using helium as a substitution medium after the foam is pulverized to 150 microns or less, the open cell rate being represented by the formula (3), $$\phi = D/Dr \times 100 \qquad (3)$$

in which D is a density measured using helium as a substitution medium and Dr has the same meaning as recited above.

8. A carbon foam according to claim 1, wherein the optical texture of the carbon constituting the foam is substantially 100% anisotropic.

9. A graphite foam which is obtained by heat-treating the carbon foam recited in claim 1 at a temperature of 2,000° C. or higher.

10. A graphite foam according to claim 9, which has a bulk density of from 0.3 g/cm³ to 1.0 g/cm³ and has a density, measured using helium as a substitution medium, of 2.0 g/cm³ or more.

11. A graphite foam according to claim 9, which has a porosity of from 50% to 90% and an open cell rate of from 90% to 100%.

12. A carbon foam according to claim 1, which has a bulk density of 0.20 g/cm³ or more.

13. A carbon foam which is obtained by heat-treating, at a temperature of from 400° C. to 800° C. under the application of pressure of from 0.1 MPa to 5 MPa with an inert gas, at least one mesophase pitch selected from the group consisting of the following mesophase pitches a, b, c and d which are obtained by polymerizing a fused polycyclic hydrocarbon or a substance containing a fused polycyclic hydrocarbon in the presence of hydrogen fluoride and boron trifluoride as catalysts, a. a mesophase pitch having an aromatic carbon index fa value of from 0.90 to 0.97, which mesophase pitch is obtained by removing the catalysts after the polymerization and then heat-treating the resultant pitch at a maximum treatment temperature in the range of from 300° C. to 500° C., the aromatic carbon index fa being determined by the following formula (1), $$fa = 1 - (H/C)/x(1 + (\text{Daromatic/Daliphatic}) \times (\epsilon\text{aliphatic}/\epsilon\text{aromatic})) \qquad (1)$$

in which (H/C) is an atom ratio of hydrogen to carbon in the pitch, x is an average number of hydrogen bonded to carbon other than aromatic carbon (x=2), (Daromatic/Daliphatic) is a ratio of the absorption intensity (Daromatic) of an aromatic C—H stretching vibration, measured with FT-IR, to the absorption intensity (Daliphatic) of an aliphatic C—H stretching vibration, measured with FT-IR, and $\epsilon$aliphatic/$\epsilon$aromatic is a specific extinction (=2), b. a mesophase pitch which is obtained by carrying out the polymerization in a catalyst molar ratio (fused polycyclic hydrocarbon/hydrogen fluoride/boron trifluoride) of hydrogen fluoride/fused polycyclic hydrocarbon= 0.2~1.0 and boron trifluoride/fused polycyclic hydrocarbon=0.01~0.1 at a reaction temperature of from 100 to 350° C., removing the catalysts and then heat-treating the resultant pitch at a maximum treatment temperature in the range of from 300° C. to 500° C., c. a mesophase pitch having a fa value of from 0.90 to 0.97 and a softening point, determined with a flow tester, of 300° C. or less, which mesophase pitch is obtained by removing the catalysts from the mesophase pitch obtained by polymerizing in the same catalyst molar ratio as that in the above b and at the same reaction temperature as that in the above b and then heat-treating the resultant mesophase pitch at a maximum treatment temperature in the range of from 400° C. to 500° C., and d. a mesophase pitch obtained as a residue when at least one mesophase pitch obtained from the group consisting of the above a, b and c is extracted with a solvent.

14. A process for the production of a carbon foam, comprising heat-treating the at least one mesophase pitch recited in claim 13 at a temperature of from 400° C. to 800° C. under the application of pressure of from 0.1 MPa to 5 MPa with an inert gas.

15. A process according to claim 14, wherein, after the at least one mesophase pitch is pulverized and then molded at a room temperature or under heat, the molded mesophase pitch is heat-treated at a temperature of from 400° C. to 800° C. under the application of pressure of from 0.1 MPa to 5 MPa with an inert gas.

16. A carbon foam which is obtained by further heat-treating the carbon foam recited in claim 13 at a temperature of from 600° C. to less than 2,000° C.

17. A process for the production of a carbon foam, which process comprises further heat-treating the carbon foam recited in claim 13 at a temperature of from 600° C. to less than 2,000° C.

18. A graphite foam which is obtained by heat-treating the carbon foam recited in claim 13 at a temperature of 2,000° C. or higher.

19. A graphite foam according to claim 18, wherein the graphite foam has a bulk density of 0.30 g/cm³ or more.

20. A process for the production of a graphite foam, which process comprises heat-treating the carbon foam recited in claim 13 at a temperature of 2,000° C. or higher.

\* \* \* \* \*

(12) INTER PARTES REEXAMINATION CERTIFICATE (0004th)

United States Patent
Kanno et al.

(10) Number: US 6,689,336 C1
(45) Certificate Issued: Aug. 1, 2006

(54) CARBON FOAM, GRAPHITE FOAM AND PRODUCTION PROCESSES OF THESE

(75) Inventors: Koichi Kanno, Tsukuba (JP); Hirotaka Tsuruya, Tsukuba (JP); Ryuji Fujiura, Tsukuba (JP); Takeshi Koshikawa, Tsukuba (JP); Fumitaka Watanabe, Tsukuba (JP)

(73) Assignee: Mitsubishi Gas Chemical Company, Inc., Tokyo (JP)

Reexamination Request:
No. 95/000,095, May 23, 2005

Reexamination Certificate for:
Patent No.: 6,689,336
Issued: Feb. 10, 2004
Appl. No.: 10/052,737
Filed: Jan. 23, 2002

(30) Foreign Application Priority Data

| Jan. 23, 2001 | (JP) | 2001-013987 |
| Jan. 7, 2002 | (JP) | 2002-000251 |

(51) Int. Cl.
*C01B 31/02* (2006.01)

(52) U.S. Cl. .................................................. 423/445 R
(58) Field of Classification Search ................... 208/22; 423/445 R, 448
See application file for complete search history.

(56) References Cited

U.S. PATENT DOCUMENTS

| 4,276,246 | A |   | 6/1981 | Bonzom |  |
| 4,773,985 | A | * | 9/1988 | Weinberg et al. | 208/39 |
| 4,789,455 | A |   | 12/1988 | Mochida et al. |  |
| 4,891,126 | A | * | 1/1990 | Mochida et al. | 208/39 |
| 5,182,010 | A | * | 1/1993 | Mochida et al. | 208/44 |
| 5,868,974 | A |   | 2/1999 | Kearns |  |
| 6,013,371 | A |   | 1/2000 | Hager et al. |  |
| 6,033,506 | A |   | 3/2000 | Klett |  |
| 6,077,464 | A | * | 6/2000 | Murdie et al. | 264/29.5 |
| 6,176,268 | B1 |   | 1/2001 | Hsich et al. |  |
| 6,228,343 | B1 |   | 5/2001 | Yoshimura et al. |  |
| 6,241,957 | B1 |   | 6/2001 | Stiller et al. |  |
| 6,261,485 | B1 |   | 7/2001 | Klett |  |
| 6,576,168 | B1 | * | 6/2003 | Hardcastle et al. | 264/29.1 |
| 6,673,328 | B1 | * | 1/2004 | Klett et al. | 423/445 R |

OTHER PUBLICATIONS

Mochida et al., "Carbon fibers from aromatic hydrocarbons", Chemtech, Feb. 1995, 29–37.*

Fujiura et al., "Evaluation of naphthalene–derived mesophase pitches as a binder for carbon—carbon composites", Carbon, 31, 1, 97–102 (1993).*

Sandu et al., "Formulation of a Mathematical Process Model for the Foaming of a Mesophase Carbon Precursor", Mat. Res. Soc. Proc., 270, 35–40 (1992).*

Klett, J., R. Hardy, et al. (2000), "High–Thermal–Conductivity, Mesophase–Pitch–Derived Carbon Foams: Effect of Precursor on Structure and Properties." Carbon 38(7): 953–973.

Mochida et al (1990), "Preparation of mesophase Pitch from Aromatic hydrocarbons by the Aid of HF/BF3" Carbon 28 Nos. 2/3: 311–319.

A 12 page data sheet received by UTB in 1995 provided by Mitsubishi Gas Chemical Co., Inc. listing properties of various AR pitches as well as process to form the same labeled and hereafter referred to as Exhibit "A".

A single page sheet provided by Mitsubishi Gas Chemical Co., Inc. dated Jul. 1995 entitled "Typical Properties of AR Resin" labeled and hereafter referred Exhibit "B".

* cited by examiner

*Primary Examiner*—Douglas McGinty

(57) ABSTRACT

A carbon foam obtained by heat-treating a mesophase pitch whose softening point is 300° C. or less according to an elevated flow tester, whose ratio (Daromatic/Daliphatic) of the absorption intensity of an aromatic C—H stretching vibration, measured with FT-IR, to the absorption intensity of an aliphatic C—H stretching vibration, measured with FT-IR, is 4.0 or less and whose optically anisotropic content is at least 80%, a graphite foam obtained by heat-treating the carbon foam recited above at a temperature of 2,000° C. or higher and production processes of these.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–20 are cancelled.

\* \* \* \* \*